D. J. NELSON.
GATE CLOSER.
APPLICATION FILED DEC. 7, 1910.

1,022,967.

Patented Apr. 9, 1912.

2 SHEETS—SHEET 1.

Witnesses
Phil E. Barnes

Inventor
David J. Nelson
By Victor J. Evans
Attorney

D. J. NELSON.
GATE CLOSER.
APPLICATION FILED DEC. 7, 1910.

1,022,967.

Patented Apr. 9, 1912.
2 SHEETS—SHEET 2.

Witnesses
Phil E. Barnes

Inventor
David J. Nelson
By Victor J. Evans
Attorney

UNITED STATES PATENT OFFICE.

DAVID J. NELSON, OF MEDIAPOLIS, IOWA.

GATE-CLOSER.

1,022,967.  Specification of Letters Patent.  Patented Apr. 9, 1912.

Application filed December 7, 1910. Serial No. 596,106.

*To all whom it may concern:*

Be it known that I, DAVID J. NELSON, a citizen of the United States, residing at Mediapolis, in the county of Des Moines and State of Iowa, have invented new and useful Improvements in Gate-Closers, of which the following is a specification.

The invention relates to a gate, and more particularly to the class of self-closing gates.

The primary object of the invention is the provision of a gate in which a person may open the same from either side thereof, and that will automatically close, thus obviating the necessity of shutting such gate by hand.

Another object of the invention is the provision of a gate which is automatically closed and that may be swung to open position in opposite directions, the said gate being easy of operation.

A further object of the invention is the provision of a gate which is simple in construction, practical and efficient in operation and inexpensive in manufacture.

With these and other objects in view, the invention consists in the construction, combination and arrangement of parts, as will be hereinafter more fully described, illustrated in the accompanying drawings, and pointed out in the claims hereunto appended.

Figure 1:
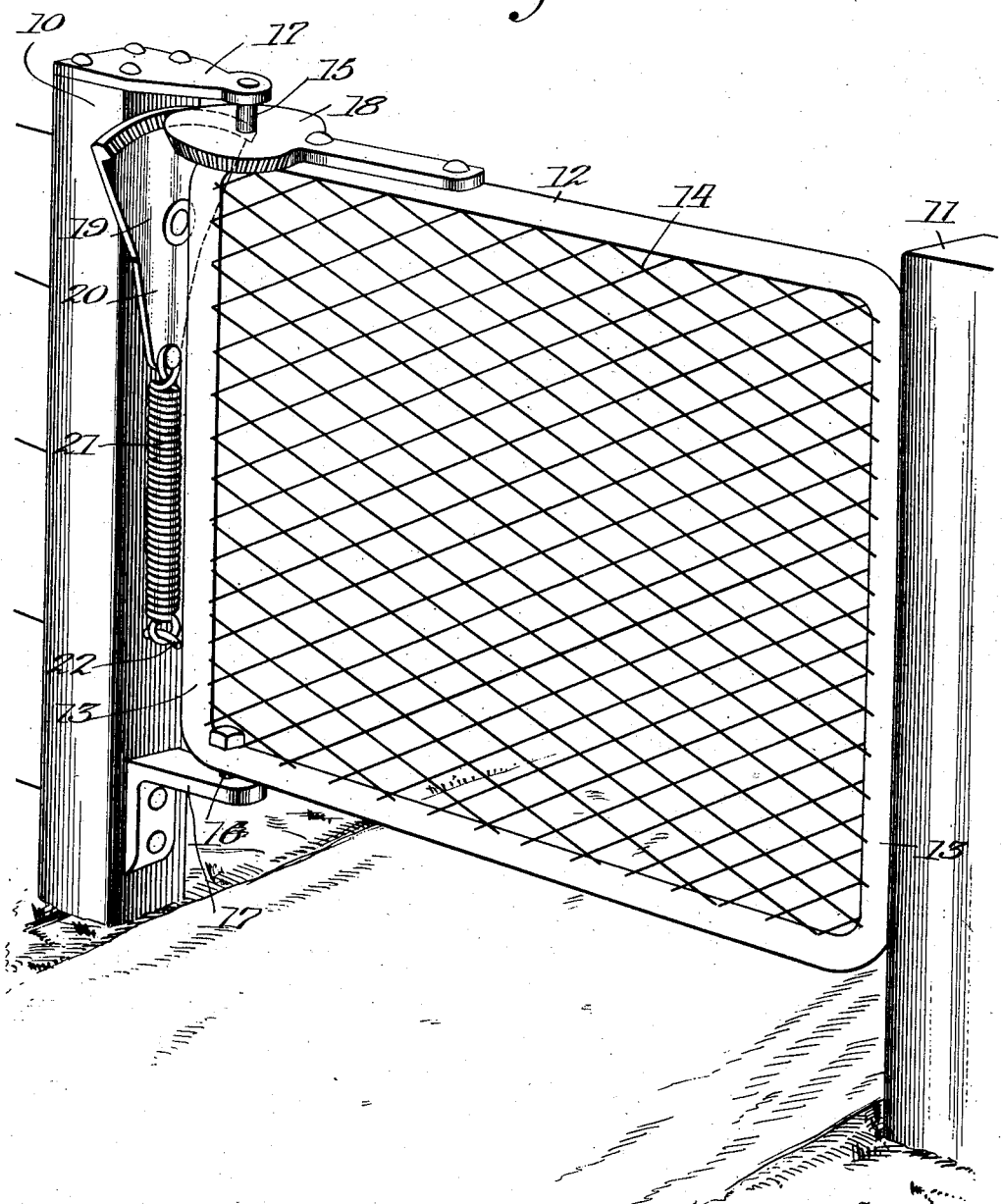
Figure 2:
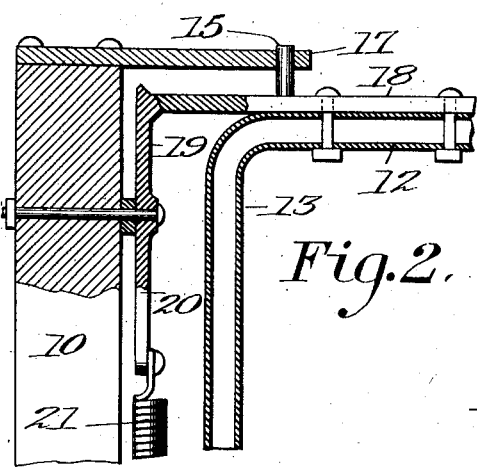
Figure 3:
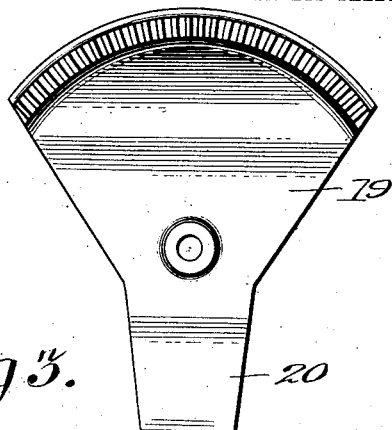
Figure 4:
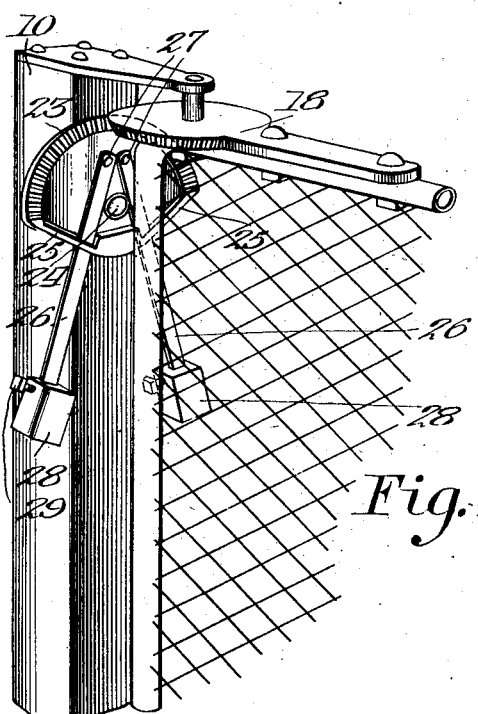
Figure 5:
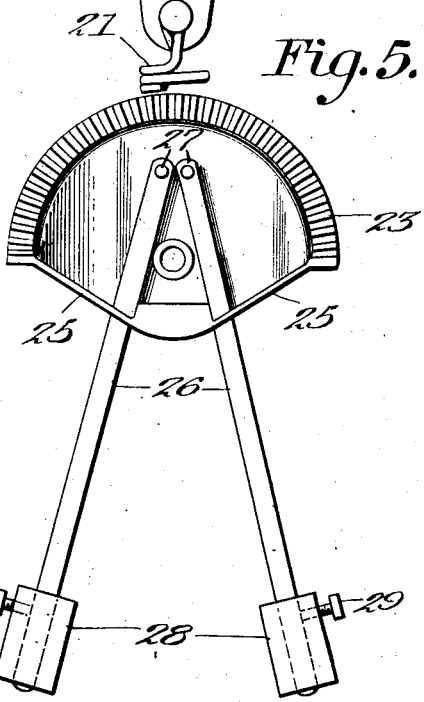
Figure 6:
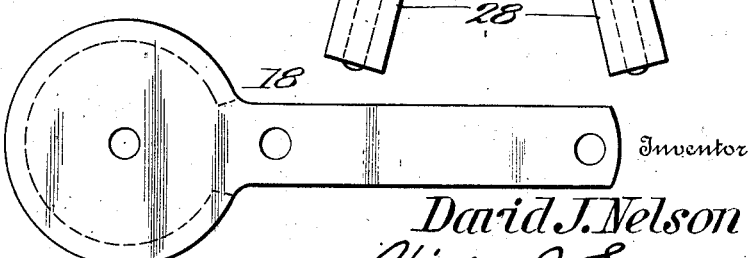

In the drawings: Figure 1 is a perspective view of a gate constructed in accordance with the invention. Fig. 2 is a fragmentary vertical sectional view through the gate post and gate, showing in detail the operating mechanism therefor. Fig. 3 is an enlarged elevation of the operating mechanism for the gate. Fig. 4 is a perspective view of the gate, showing a modification of the invention. Fig. 5 is an enlarged detail view of the operating mechanism therefor. Fig. 6 is a top plan view of a toothed segment carried by the gate.

Similar reference characters indicate corresponding parts throughout the several views of the drawings.

Referring to the drawings by numerals, 10 and 11 designate the gate posts respectively, arranged on opposite sides of a path or roadway, the posts being mounted in the ground in the ordinary well-known manner, and between which is adapted to swing a gate frame of any ordinary or conventional construction, comprising horizontal bars 12, vertical bars 13, and the lattice or net center 14, the latter being connected to the said bars in any suitable manner.

Projecting from the horizontal bars 12 of the gate frame in alinement with the rear vertical bar 13 thereof are upper and lower pivot members 15 and 16, the same being journaled in bearing plates 17, suitably fixed in the post 10 for the mounting of the gate frame thereon, so as to swing on a vertical axis laterally in either direction from the normally closed position.

Securely mounted on the gate frame and superimposed upon the upper horizontal bar 12 thereof at its rear end is a horizontal sector-shaped bevel toothed gear 18, the upper pivot 15 being passed centrally through the said gear. Pivoted upon the gate post 10, below the gear 18, and adapted to mesh therewith, is a segmental-shaped gear 19, the same being formed with a centrally depending extension 20 serving as an arm, to which latter is pivotally connected the upper end of a retractile spring 21 which has its opposite end detachably connected to a hook member 22 suitably secured in the gate post 11 spaced from the free end of the arm 20 of the segmental gear.

In Figs. 4, 5 and 6, there is shown a slight modification of the invention, wherein the swinging gate carrying the sector-shaped gear or pinion 19 meshes with a segmental-shaped gear 23, the latter being centrally connected by means of a pivot 24 to the gate post 10, and this gear 23 is formed with spaced guide loops 25, through which passes weight carrying arms 26, the same being arranged in downwardly diverging relation to each other and have their inner ends pivoted, as at 27, contiguous a vertical imaginary line drawn through the axis of movement of the said gear 24, the outer end of the arm 26 being provided with adjustable weight keys 28, which latter are adjustably held on the said arm by means of binding screws 29, threaded therein and engaging the arm.

It will be evident that by adjusting the weight keys 28 upon the arms 26 connected with the gear 23, the latter may be regulated as to the extent of its arcuate movement. Thus, it will be seen that the gate frame may be maintained in alinement with the gate posts.

The gate may be swung to open position in opposite direction and will automatically close when released, and be sustained in such closed position without the requirement of a catch or keeper on the gate and post respectively.

What is claimed is:

1. The combination with a gate supporting post, of a swinging gate, a sector-shaped gear secured to the gate, a segmental-shaped gear pivotally connected to the post and meshing with said first named gear, said segmental-shaped gear carrying two weighted arms pivoted thereto, and adapted to swing outwardly when the gate is opened and said weighted arms serving to return the gate to closed position.

2. The combination with a post, a swinging gate connected therewith, a sector-shaped gear fixed to the gate meshing with a segmental-shaped gear pivoted to the post, arms pivotally secured to the segmental gear, each of said arms carrying a weight slidably mounted thereon, the said weight being provided with a set screw to hold the same against vertical movement thereof.

3. The combination with a post, a swinging gate, a sector-shaped gear carried by the gate and meshing with a segmental gear pivoted to the post, said segmental gear being formed with spaced guide loops through which passes weight carrying arms said arms being pivoted to the segmental gear and extending downwardly in diverging relation to each other.

In testimony whereof I affix my signature in presence of two witnesses.

DAVID J. NELSON.

Witnesses:
 WILLIE C. PIERSON,
 WALTER JOHNSON.

Copies of this patent may be obtained for five cents each, by addressing the "Commissioner of Patents Washington, D. C."